United States Patent
Nagamori (10) Patent No.: US 9,857,853 B2
(45) Date of Patent: *Jan. 2, 2018

(54) SYSTEM, APPARATUS, AND METHOD FOR DEVICE CONTROL

(71) Applicant: RICOH COMPANY, LTD., Tokyo (JP)

(72) Inventor: Akira Nagamori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 280 days.

This patent is subject to a terminal disclaimer.

(21) Appl. No.: 14/639,204

(22) Filed: Mar. 5, 2015

(65) Prior Publication Data

US 2015/0261271 A1    Sep. 17, 2015

(30) Foreign Application Priority Data

Mar. 17, 2014 (JP) ................................. 2014-054164

(51) Int. Cl.
| | |
|---|---|
| *G06F 15/16* | (2006.01) |
| *G06F 1/26* | (2006.01) |
| *H04L 12/12* | (2006.01) |
| *H04N 7/15* | (2006.01) |

(52) U.S. Cl.
CPC ................ *G06F 1/26* (2013.01); *H04L 12/12* (2013.01); *H04N 7/15* (2013.01); *Y02B 60/34* (2013.01)

(58) Field of Classification Search
CPC ....... H04L 65/403; H04L 47/72; H04L 12/12; H04L 12/1818; H04M 3/565; Y02B 60/34; G06F 1/26; G06Q 10/1095
USPC .......................... 709/203, 204, 229; 713/300
See application file for complete search history.

(56) References Cited

U.S. PATENT DOCUMENTS

| | | | | |
|---|---|---|---|---|
| 7,528,714 | B2 * | 5/2009 | Schlesier ................ | H04W 4/02 340/539.13 |
| 8,909,702 | B2 | 12/2014 | Golovchinsky et al. | |
| 2007/0143402 | A1 * | 6/2007 | Kumagai .................. | B43L 1/00 709/204 |
| 2008/0184115 | A1 | 7/2008 | Back et al. | |
| 2009/0254839 | A1 * | 10/2009 | Kripalani .............. | G06F 3/0231 715/753 |
| 2010/0037269 | A1 * | 2/2010 | Hayashi ................. | H04N 5/775 725/58 |
| 2010/0049579 | A1 * | 2/2010 | Suzuki ............. | G06Q 10/06311 705/7.19 |
| 2011/0307800 | A1 | 12/2011 | Back et al. | |
| 2013/0332513 | A1 * | 12/2013 | Honda .................... | H04L 67/42 709/203 |

FOREIGN PATENT DOCUMENTS

| | | |
|---|---|---|
| JP | 2006-146415 | 6/2006 |
| JP | 5088153 | 9/2012 |

* cited by examiner

*Primary Examiner* — Frantz Jean
(74) *Attorney, Agent, or Firm* — Cooper & Dunham LLP (57) ABSTRACT

A device controlling system controls devices connected via a network. The device controlling system includes a reserving unit configured to receive place identifying information for identifying a place and a usage time and date when the place is used, and make a reservation for usage of the place and a device arranged at the place on the usage time and date; and a device controller configured to bring the device to a power-on state based on the usage time and date and device identifying information for identifying the device on the network.

10 Claims, 7 Drawing Sheets

| RESERVATION IDENTIFYING INFORMATION | PLACE IDENTIFYING INFORMATION | USAGE TIME AND DATE | USER IDENTIFYING INFORMATION | FIRST DEVICE IDENTIFYING INFORMATION |
|---|---|---|---|---|
| 201 | 001 | 2/1/2014 13:00-15:00 | 301 | 101 |
| ⋮ | ⋮ | ⋮ | ⋮ | ⋮ |

FIG.5

| FIRST DEVICE IDENTIFYING INFORMATION | SECOND DEVICE IDENTIFYING INFORMATION |
|---|---|
| 101 | xxx.xxx.xxx.xxx |
| ⋮ | ⋮ |

SYSTEM, APPARATUS, AND METHOD FOR DEVICE CONTROL

CROSS-REFERENCE TO RELATED APPLICATION

The present application claims priority to and incorporates by reference the entire contents of Japanese Patent Application No. 2014-054164 filed in Japan on Mar. 17, 2014.

BACKGROUND OF THE INVENTION

1. Field of the Invention

The present invention relates to a system, an apparatus, and a method for device control.

2. Description of the Related Art

Conventionally, a technique of assisting a meeting has been known. For example, Japanese Patent No. 5088153 discloses a technique of assisting a presentation when a presenter makes a presentation in a room such as a meeting room by controlling operations of a device and an application to be used in the presentation by the presenter based on settings of the device and the application of the presenter.

However, the presenter or an associate participant of the meeting needs to manually prepare the settings of the device and the application in advance or manually boot the device in advance to use the assistance in the above-explained conventional technique.

As explained, since being nothing more than controlling the device to perform an operation appropriate to a purpose in using the device at a given site, the conventional technique requires manpower of a user and the like to bring the device to the state that enables the operation appropriate to the purpose to be performed, thereby causing a load on the user.

Therefore, there is a need for a device controlling system, a device controlling apparatus, and a device controlling method capable of suppressing a load on a user in bringing a device to a state that enables an operation appropriate to a purpose to be performed.

According to an embodiment, there is provided a device controlling system that controls devices connected via a network, including: a reserving unit that receives an input of place identifying information for identifying a place and a usage time and date when the place is used and makes a reservation for usage of the place and a device arranged at the place on the usage time and date; and a device controller that controls and brings the device to a power-on state based on the usage time and date and device identifying information for identifying the device on the network.

SUMMARY OF THE INVENTION

It is an object of the present invention to at least partially solve the problems in the conventional technology.

According to an embodiment, there is provided a device controlling system for controlling devices connected via a network. The device controlling system includes a reserving unit configured to receive place identifying information for identifying a place and a usage time and date when the place is used, and make a reservation for usage of the place and a device arranged at the place on the usage time and date; and a device controller configured to bring the device to a power-on state based on the usage time and date and device identifying information for identifying the device on the network.

According to another embodiment, there is provided a device controlling apparatus used in a device controlling system for controlling devices connected via a network. The device controlling apparatus includes a reserving unit configured to receive place identifying information for identifying a place and a usage time and date when the place is used, and make a reservation for usage of the place and a device arranged at the place on the usage time and date; and a device controller configured to bring the device to a power-on state based on the usage time and date and device identifying information for identifying the device on the network.

According to still another embodiment, there is provided a device controlling method implemented in a device controlling system for controlling devices connected via a network. The device controlling method includes receiving place identifying information for identifying a place and a usage time and date when the place is used; making a reservation for usage of the place and a device arranged at the place on the usage time and date; and bringing the device to a power-on state based on the usage time and date and device identifying information for identifying the device on the network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of a system, an apparatus, a method, and a program for device control according to the present invention will be explained in detail below with reference to the accompanying drawings.

Figure 1:
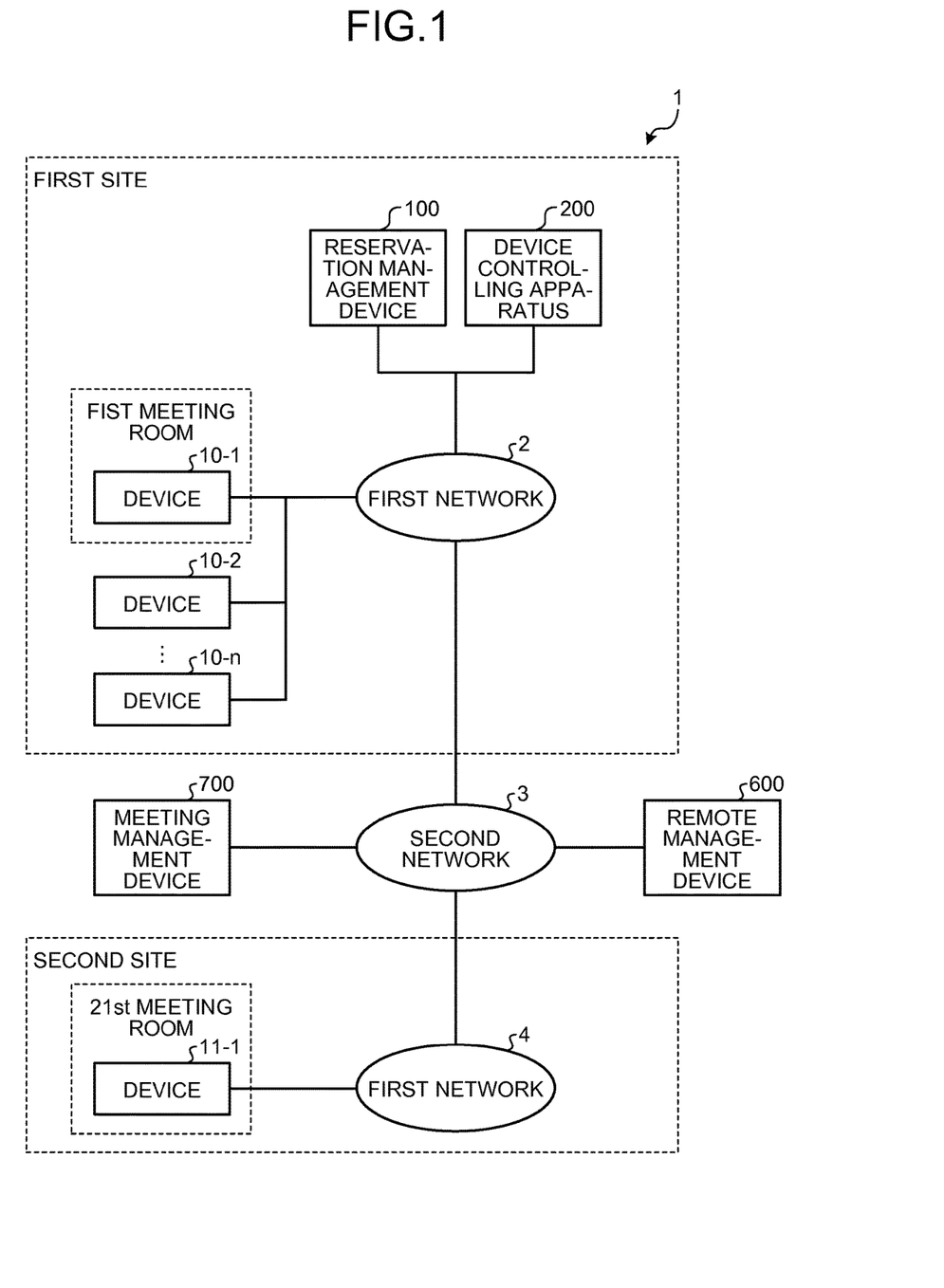
FIG. 1 is a block diagram of an example of a configuration of a device controlling system according to an embodiment.

FIG. 1 is a block diagram of an example of a configuration of a device controlling system 1 according to an embodiment. As illustrated in FIG. 1, the device controlling system 1 is provided with devices 10-1 to 10-*n* (n is a natural integer equal to or more than one), a device 11-1, a reservation management device 100, a device controlling apparatus 200, a remote management device 600, and a meeting management device 700.

The devices 10-1 to 10-$n$, the reservation management device 100, and the device controlling apparatus 200 are arranged in a first SITE. The device 10-1 may be a device which is arranged (equipped) in a first meeting room in the first SITE or a device which can be used in the first meeting room. The devices arranged in the first SITE are connected to a first network 2.

The device 11-1 is arranged in a second SITE. The device 11-1 may be a device which is arranged (equipped) in a 21st meeting room in the second SITE or a device which can be used in the 21st meeting room. While the device 11-1 is illustrated as devices arranged in the second SITE in the example illustrated in FIG. 1, the same devices as the first SITE are arranged in fact. In the example illustrated in FIG. 1, the illustration of the devices is omitted. The devices including the device 11-1 arranged in the second SITE are connected to a first network 4.

Here, the first SITE and the second SITE, which are bases of a company such as a business facility and a plant, for example, are assumed to be placed in areas physically away in distance from each other. While the first SITE and the second SITE are illustrated as the bases in the example illustrated in FIG. 1, the number of bases is not limited to two and may be three or more.

The first network 2 and the first network 4 are connected via a second network 3. The remote management device 600 and the meeting management device 700 are connected to the second network 3. While a LAN (Local Area Network) is taken as an example for the first network 2 and the first network 4 and the Internet is taken as an example for the second network 3, the present invention is not limited thereto. The second network 3 may be a dedicated line, for example.

The devices 10-1 to 10-$n$ and the device 11-1 may be electronic devices of various kinds such as a projector, a fluorescent light, an air conditioner, a meeting terminal, an electronic blackboard, a camera, a refrigerator, and an automatic vending machine; image forming devices such as a printer, a copying machine, an MFP (Multifunction Peripheral), a scanner, and a facsimile device; and information processing devices such as a PC (Personal Computer) and a tablet terminal. Here, the multifunction peripheral includes at least two functions among a copying function, a printing function, a scanner function, and a facsimile function.

While the devices 10-1 to 10-$n$ are assumed to be management targets of the device controlling apparatus 200 in the embodiment, the present invention is not limited thereto. The devices 10-1 to 10-$n$ are sometimes referred to simply as "device 10" in the explanation below when there is no necessity of discrimination thereamong.

Figure 2:
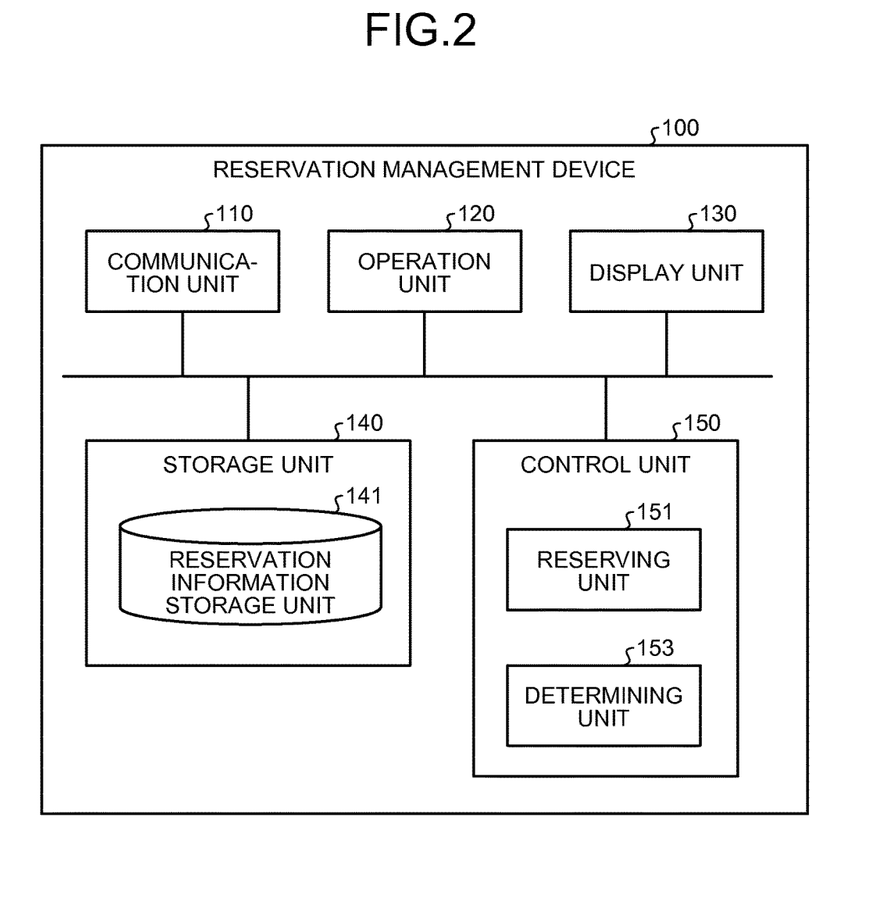
FIG. 2 is a block diagram of an example of a configuration of a reservation management device according to the embodiment.

FIG. 2 is a block diagram of an example of a configuration of the reservation management device 100 according to the embodiment. As illustrated in FIG. 2, the reservation management device 100 is provided with a communication unit 110, an operation unit 120, a display unit 130, a storage unit 140, and a control unit 150.

The communication unit 110, which communicates with an external device such as the device controlling apparatus 200 via a network, can be realized by communication devices such as an NIC (Network Interface Card).

The operation unit 120, which performs inputs of various operations, can be realized by input devices such as a keyset, a mouse, a touch pad, and a touch screen.

The display unit 130, which displays screens of various kinds, can be realized by display devices such as a liquid crystal display and a touch screen type display.

The storage unit 140 stores various kinds of programs to be executed in the reservation management device 100 and data to be used in processing of various kinds to be executed in the reservation management device 100. The storage unit 140 can be realized by at least one of storage devices capable of magnetic, optical, or electric storage such as an HDD (Hard Disk Drive), an SSD (Solid State Drive), a memory card, an optical disk, a ROM (Read Only Memory), and a RAM (Random Access Memory). The storage unit 140 is provided with a reservation information storage unit 141. The details of the reservation information storage unit 141 will be explained later.

The control unit 150, which controls components of the reservation management device 100, can be realized by a control device such as a CPU (Central Processing Unit). The control unit 150 is provided with a reserving unit 151 and a determining unit 153. The details of the reserving unit 151 and the determining unit 153 will be explained later.

Figure 3:
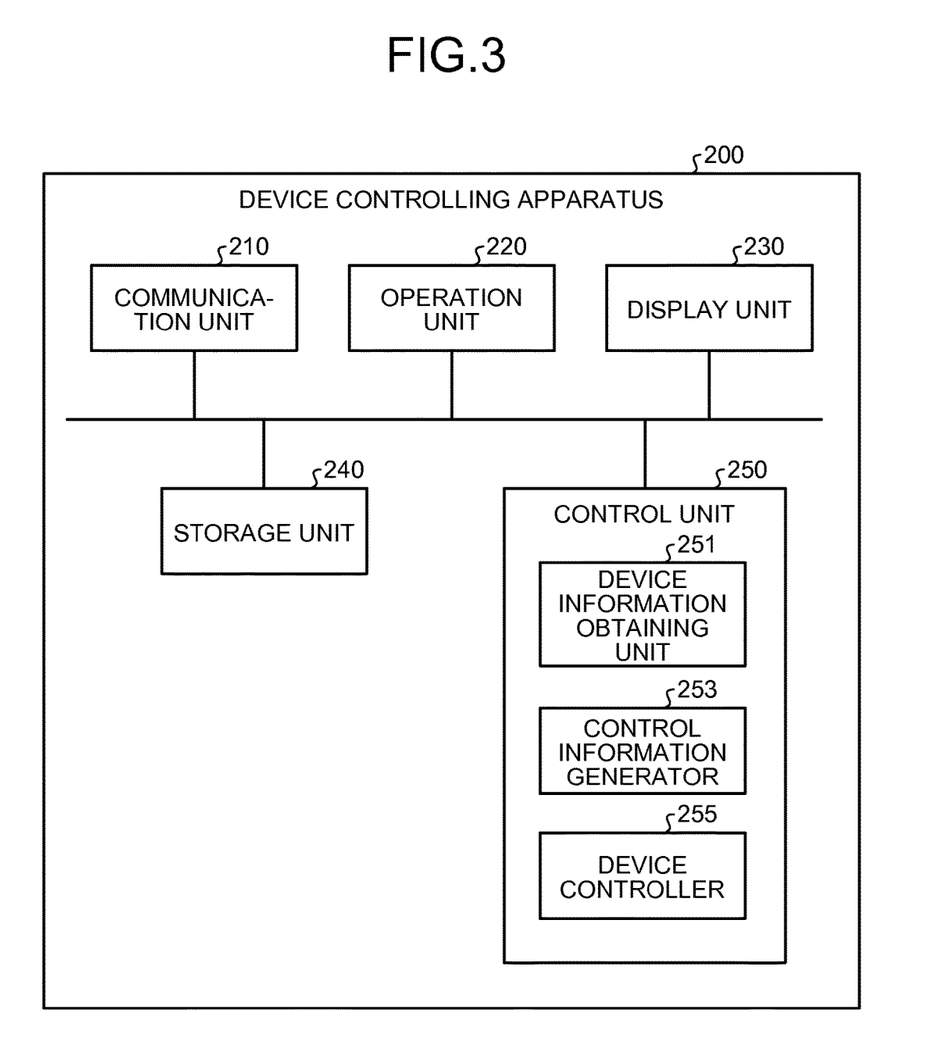
FIG. 3 is a block diagram of an example of a configuration of a device controlling apparatus according to the embodiment.

FIG. 3 is a block diagram of an example of a configuration of the device controlling apparatus 200 according to the embodiment. As illustrated in FIG. 3, the device controlling apparatus 200 is provided with a communication unit 210, an operation unit 220, a display unit 230, a storage unit 240, and a control unit 250.

The communication unit 210, which communicates with external devices such as the devices 10-1 to 10-$n$, the reservation management device 100, the remote management device 600, and the meeting management device 700 via a network, can be realized by communication devices such as an NIC.

The operation unit 220, which performs inputs of various operations, can be realized by input devices such as a keyset, a mouse, a touch pad, and a touch screen.

The display unit 230, which displays screens of various kinds, can be realized by display devices such as a liquid crystal display and a touch screen type display.

The storage unit 240 stores various kinds of programs to be executed in the device controlling apparatus 200 and data to be used in processing of various kinds to be executed in the device controlling apparatus 200. The storage unit 240 can be realized by at least one of storage devices capable of magnetic, optical, or electric storage such as an HDD, an SSD, a memory card, an optical disk, a ROM, and a RAM. The detail of the storage unit 240 will be explained later.

The control unit 250, which controls components of the device controlling apparatus 200, can be realized by a control device such as a CPU. The control unit 250 is provided with a device information obtaining unit 251, a control information generator 253, and a device controller 255. The details of the device information obtaining unit 251, the control information generator 253, and the device controller 255 will be explained later.

Here, the reserving unit 151, the determining unit 153, and the reservation information storage unit 141 of the reservation management device 100 will be explained.

The reserving unit 151 receives an input of place identifying information for identifying a place and a usage time and date when the place is used, and reserves the place and a device arranged at the place to be used during the period of the usage time and date.

For example, the reserving unit 151 receives, from an information processing device used by a user, an input of place identifying information, usage time and date, and user identifying information for identifying the user who uses the place. The reserving unit 151 obtains at least one piece of first device identifying information associated with the received place identifying information and transmits the first device identifying information to the information processing device used by the user to allow the user to select the first device identifying information of the device that the user will use from at least the one piece of the first device identifying information, and the receives an input of the first device identifying information selected from the information processing device.

Since the place identifying information and the first device identifying information are associated with each other in advance and stored in the storage unit 140, it is possible in the embodiment to obtain at least the one piece of the first device identifying information associated with the place identifying information from the received place identifying information. The information processing device used by the user may be any one of the devices 10-2 to 10-*n* or may be a not-illustrated device other than the device 10. In other words, the information processing device used by the user may or may not be a device as a management target of the device controlling apparatus 200 in the embodiment.

The reserving unit 151 then generates reservation information which indicates that the user indicated by the received user identifying information makes a reservation for usage of the place indicated by the received place identifying information and the device arranged at the place (device indicated by the selected first device identifying information) during the period of the received usage time and date, and stores the reservation information in the storage unit 140.

Figure 4:
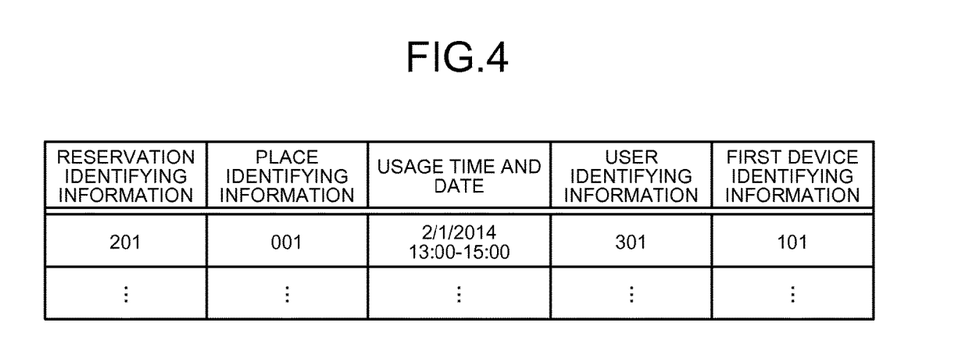
FIG. 4 illustrates an example of reservation information according to the embodiment.

FIG. 4 illustrates an example of reservation information according to the embodiment. While the reservation information includes reservation identifying information, the place identifying information, the usage time and date, the user identifying information, and the first device identifying information in the example illustrated in FIG. 4, the present invention is not limited thereto.

The reservation identifying information is an identifier for identifying reservation information and a reservation ID is taken as an example. The place identifying information is an identifier for identifying the place and a place ID is taken as an example. While the embodiment is explained on the assumption that the place is a meeting room, the present invention is not limited thereto and the place may be anywhere whose reservation is available. The usage time and date is a time and date when the place indicated by the place identifying information is used. The user identifying information is an identifier for identifying the user who uses the place indicated by the place identifying information and a user ID (staff ID) is taken as an example. The first device identifying information is an identifier for identifying the device arranged at the place indicated by the place identifying information, and a serial number and a model number are taken as examples.

The reservation information illustrated in FIG. 4 is generated, by the reserving unit 151, by adding reservation identifying information (201) to the place identifying information (001), the usage time and date (Feb. 1, 2014, 13:00-15:00), the user identifying information (301), and the first device identifying information (101) which are received from the information processing device used by the user.

Specifically, the reservation information of the reservation identifying information (201) illustrated in FIG. 4 indicates that the user indicated by the user identifying information (301) will use the place indicated by the place identifying information (001) and the device indicated by the first device identifying information (101) during the usage time and date (Feb. 1, 2014 13:00-15:00).

While the embodiment is explained on the assumption that the place indicated by the place identifying information (001) is the first meeting room of the first SITE and the device indicated by the first device identifying information (101) is the device 10-1, the present invention is not limited thereto.

While the number of users who use the reserved place is one in the example illustrated in FIG. 4, the present invention is not limited thereto and the number of users may be two or more. Besides, while the number of devices 10 arranged in the reserved place is one in the example illustrated in FIG. 4, the present invention is not limited thereto and the number of devices may be two or more.

Here, when a meeting terminal is included in devices arranged at the reserved place, the reserving unit 151 may further receive an input of specifying information for specifying another meeting terminal which communicates with the meeting terminal, specify the other meeting terminal based on the specifying information, further add first device identifying information of the specified another meeting terminal to the reservation information, and further make a reservation for usage of the other meeting terminal, too.

The place identifying information of the place where the other meeting terminal is arranged is taken as an example of the specifying information. For example, assumed is a case where the other meeting terminal is the device 11-1 and the place indicated by the place identifying information (specifying information) is the 21st meeting room of the second SITE. In this case, the reserving unit 151 is capable of obtaining the first device identifying information of the device 11-1 from the place identifying information (specifying information) by using the remote management device 600 and obtaining, from the reservation management device (not illustrated) of the second SITE, information in which a correspondence relation between the place identifying information and the first device identifying information is defined. Here, the specifying information may be the first device identifying information itself of the other meeting terminal.

The reserving unit 151 may further receive an input of software identifying information for identifying software to be used in the device indicated by the received first device identifying information and may further make a reservation for usage of the software with the device.

In this case, the first device identifying information and the software identifying information are associated to each other in advance and stored in the storage unit 140 and the reserving unit 151 obtains at least one piece of software identifying information associated with the first device identifying information from the received first device identifying information. It is only necessary for the reserving unit 151 to transmit the obtained at least one piece of software identifying information to the information processing device used by the user to allow the user to select software identifying information of the software that the user will use from at least the one piece of software identifying information, and to receive an input of the selected software identifying information from the information processing device.

The reserving unit 151 may further receive an input of electronic data to be used in the device indicated by the received first device identifying information and further make a reservation for usage of the electronic data. In this case, it is only necessary for the reserving unit 151 to further receive an input of the electronic data from the information processing device used by the user.

The determining unit 153 sees the reservation information stored in the reservation information storage unit 141 to determine presence/absence of reservation information whose usage time and date starts in a first period of time. When the reservation information whose usage time and date starts in the first period of time is present, the determining unit 153 notifies the device controlling apparatus 200 of the first device identifying information included in the reservation information. Here, the first period of time can be set according to the situation where the device controlling system 1 is used and can be set to three minutes or five minutes, for example.

When the reservation information whose usage time and date starts in the first period of time is the reservation information of the reservation identifying information (201) illustrated in FIG. 4, for example, the determining unit 153 notifies the device controlling apparatus 200 of the first device identifying information (101) to make the power of the device 10-1 indicated by the first device identifying information (101) turned on.

When the usage of another meeting terminal is included in the reservation, the determining unit 153 may notify the device controlling apparatus 200 of the first device identifying information of the other meeting terminal in addition to the first device identifying information (101). When the usage of software is included in the reservation, the determining unit 153 may notify the device controlling apparatus 200 of software identifying information of the software in addition to the first device identifying information (101). When the usage of electronic data is included in the reservation, the determining unit 153 may notify the device controlling apparatus 200 of the electronic data in addition to the first device identifying information (101).

The determining unit 153 sees the reservation information stored in the reservation information storage unit 141 to determine presence/absence of reservation information whose usage time and date ends in a second period of time. When the reservation information whose usage time and date ends in the second period of time is present, the determining unit 153 sees another piece of reservation information including the place identifying information included in the reservation information to determine the presence/absence of reservation for using the place indicated by the place identifying information right after the end of the usage time and date. Here, the second period of time can be set in accordance with the situation where the device controlling system 1 is used and can be set to ten minutes or five minutes, for example.

When the reservation is not present, the determining unit 153 notifies the device controlling apparatus 200 of the first device identifying information included in the reservation information whose usage time and date ends in the second period of time and the absence of next reservation, and when the reservation is present, the determining unit 153 notifies the device controlling apparatus 200 of the first device identifying information included in the reservation information whose usage time and date ends in the second period of time and the presence of the next reservation.

For example, when the reservation information whose usage time and date ends in the second period of time is the reservation information of the reservation identifying information (201) illustrated in FIG. 4 and next reservation is not present, the determining unit 153 notifies the device controlling apparatus 200 of the first device identifying information (101) and the absence of the next reservation, and when the next reservation is present, the determining unit 153 notifies the device controlling apparatus 200 of the first device identifying information (101) and the presence of the next reservation.

Next, the storage unit 240, the device information obtaining unit 251, the control information generator 253, and the device controller 255 of the device controlling apparatus 200 will be explained.

The device information obtaining unit 251 obtains from the devices 10-1 to 10-n and manages on the storage unit 240, device information. Specifically, the device information obtaining unit 251 performs, with the devices 10-1 to 10-n, a communication using a universal protocol such as an SNMP (Simple Network Management Protocol) generally used in device management to obtain device information. For obtaining the device information, a method that the device information obtaining unit 251 voluntarily obtains the device information from the devices 10-1 to 10-n or a method that the devices 10-1 to 10-n voluntarily notifies the device controlling apparatus 200 (the device information obtaining unit 251) of the device information may be adopted.

Figure 5:
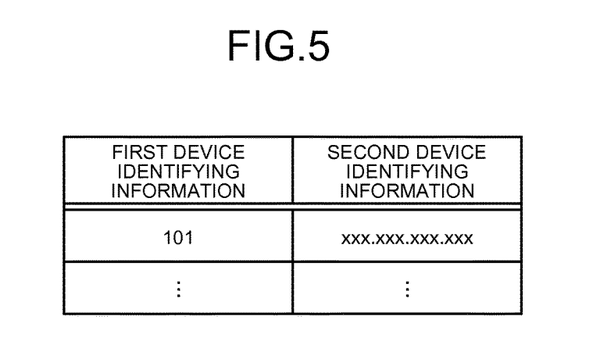
FIG. 5 illustrates an example of device information according to the embodiment.

The device information according to the embodiment includes at least second device identifying information (an example of device identifying information) for identifying the device 10 on the network. FIG. 5 illustrates an example of the device information according to the embodiment. While the device information in the example illustrated in FIG. 5 includes the first device identifying information and the second device identifying information, the present invention is not limited thereto.

The first device identifying information is an identifier for identifying the device 10 and a serial number, a model number, and the like are taken as examples. The second device identifying information is an identifier for identifying the device 10 on the network and an IP address and the like are taken as examples.

The control information generator 253 obtains, from the storage unit 240, the device information including the first device identifying information notified by the reservation management device 100 to turn on the power of the device 10 and uses the device information to generate first control information that controls and brings the device 10 indicated by the first device identifying information to a state where the power is turned on. Here, the first control information includes at least a power-on command for WOL (Wake On LAN) using the second device identifying information. In the embodiment, the control to the power-on state includes operational controls including a partial power control (power is supplied only to a part of multiple substrates, for example) in a state where a main power is turned on and a control of turning on the main power.

Since the reservation management device 100 notifies, when determining that it is the first period of time before the usage time and date starts, the device controlling apparatus 200 of the first device identifying information to turn on the device 10 in the embodiment, the control information generator 253 is configured to generate the first control information after it becomes the first period of time before the usage time and date starts. However, the timing of the generation is not limited thereto and the first control information may be generated in advance, for example.

For example, assumed is a case where the reservation management device 100 notifies the device controlling apparatus 200 of the first device identifying information (101) to turn on the device 10-1. In this case, the control information generator 253 obtains the device information (see FIG. 5)

including the first device identifying information (101) from the storage unit 240 and generates control information including the power-on command for WOL using the second device identifying information (xxx.xxx.xxx.xxx) as the first control information that controls and brings the device 10-1 to the power-on state.

Here, the control information generator 253 may generate, as the first control information, control information including a command for a control to a network connection state in addition to the power-on command for WOL using the second device identifying information (xxx.xxx.xxx.xxx).

Besides, when the device 10-1 is a meeting terminal, the control information generator 253 may generate, as the first control information, control information including a command that includes the second device identifying information based on the first device identifying information of another meeting terminal notified by the reservation management device 100 and brings the meeting terminal to a state of being available for meeting with the other meeting terminal in addition to the power-on command for WOL using the second device identifying information (xxx.xxx.xxx.xxx).

For example, when the other meeting terminal is the device 11-1, the control information generator 253 is able to obtain the second device identifying information based on the first device identifying information of the other meeting terminal by using the remote management device 600 and obtaining device information from the device controlling apparatus (not illustrated) at the second SITE.

Besides, the control information generator 253 may generate, as the first control information, control information that causes the device 10-1 to execute software indicated by the software identifying information notified by the reservation management device 100 in addition to the power-on command for WOL using the second device identifying information (xxx.xxx.xxx.xxx).

The control information generator 253 obtains, from the storage unit 240, device information including the first device identifying information notified by the reservation management device 100 together with the presence/absence of next reservation and uses the device information to generate second control information that causes the device 10 to output an image or a sound announcing the presence/absence of an extension of the usage time and date or that the usage time and date almost reaches the end time.

Since the reservation management device 100 notifies the device controlling apparatus 200 of the presence/absence of next reservation and the first device identifying information when determining that it is the second period of time before the usage time and date ends in the embodiment, the control information generator 253 is configured to generate the second control information after it becomes the second period of time before the usage time and date ends. However, the timing of the generation is not limited thereto and the second control information may be generated in advance, for example.

For example, assumed is a case where the reservation management device 100 notifies the device controlling apparatus 200 of the absence of next reservation and the first device identifying information (101). In this case, the control information generator 253 obtains, from the storage unit 240, the device information (see FIG. 5) including the first device identifying information (101) and generates, as the second control information, control information that uses the second device identifying information (xxx.xxx.xxx.xxx) and causes the device 10-1 to output the image or the sound announcing the presence/absence of the extension of the usage time and date. For the image or the sound announcing the presence/absence of the extension of the usage time and date, data may be stored in the storage unit 240 in advance and used.

Besides, assumed is a case where the reservation management device 100 notifies the device controlling apparatus 200 of the presence of next reservation and the first device identifying information (101), for example. In this case, the control information generator 253 obtains the device information (see FIG. 5) including the first device identifying information (101) from the storage unit 240 and generates, as the second control information, control information that uses the second device identifying information (xxx.xxx.xxx.xxx) and causes the device 10-1 to output the image or the sound announcing that the usage time and date almost reaches the end time. For the image or the sound announcing that the usage time and date almost reaches the end time, data may be stored in the storage unit 240 in advance and used.

The device controller 255 controls and brings the device 10 at least to the power-on state based on the usage time and date of the reservation information and the second device identifying information of the device 10. Specifically, the device controller 255 uses the first control information generated by the control information generator 253 at least to control and bring the device 10 to the power-on state when the reservation management device 100 determines that it is the first period of time before the usage time and date starts.

For example, assumed is a case where the first control information is control information including the power-on command for WOL using the second device identifying information (xxx.xxx.xxx.xxx). In this case, the device controller 255 uses the first control information to control and bring the device 10-1 to the power-on state.

Besides, assumed is a case where the first control information is control information including the command for the control to the network connection state in addition to the power-on command for WOL using the second device identifying information (xxx.xxx.xxx.xxx), for example. In this case, the device controller 255 uses the first control information to control and bring the device 10-1 to the power-on state and the network connection state.

In addition, assumed is a case where the first control information is control information including a command that includes the second device identifying information (xxx.xxx.xxx.xxx) and second device identifying information of another meeting terminal and brings the device 10-1 as a meeting terminal to a state of being available for meeting with the other meeting terminal in addition to the power on-command for WOL using the second device identifying information (xxx.xxx.xxx.xxx), for example. In this case, the device controller 255 uses the first control information to control and bring the device 10-1 as the meeting terminal to the power-on state and to the state of being available for meeting with the other meeting terminal. Specifically, the device controller 255 controls and brings the device 10-1 as the meeting terminal to the power-on state and causes the device 10-1 as the meeting terminal to transmit the second device identifying information (xxx.xxx.xxx.xxx) and the second device identifying information of the other meeting terminal to the meeting management device 700. The meeting management device 700 thus controls and brings the device 10-1 as the meeting terminal and the other meeting terminal to the state where both are available for meeting.

Besides, assumed is a case where the first control information is control information that causes the device 10-1 to execute software in addition to the power-on command for WOL using the second device identifying information (xxx.xxx.xxx.xxx), for example. In this case, the device controller 255 uses the first control information to control and bring the device 10-1 to the power-on state and causes the device 10-1 to execute the software indicated by the software identifying information.

When electronic data is notified by the reservation management device 100, for example, the device controller 255 uses the first control information to control and bring the device 10-1 to the power-on state and distributes the electronic data.

When the reservation management device 100 determines that it is the second period of time before the usage time and date ends, the device controller 255 uses the second control information generated by the control information generator 253 to cause the device 10 to output the image or the sound announcing the presence/absence of the extension of the usage time and date or that the usage time and date almost reaches the end time.

For example, assumed is a case where the second control information is control information that causes the device 10-1 to output the image or the sound announcing the presence/absence of the extension of the usage time and date. In this case, the device controller 255 uses the second control information to cause the device 10-1 to output the image or the sound announcing the presence/absence of the extension of the usage time and date. In this case, it is only necessary that the device 10-1 is capable of outputting an image or a sound and a projector, a meeting terminal, an electronic blackboard, an image forming device, and an information processing device may be taken as examples.

Besides, assumed is a case where the second control information is control information that causes the device 10-1 to output the image or the sound announcing that the usage time and date almost reaches the end time, for example. In this case, the device controller 255 uses the second control information to cause the device 10-1 to output the image or the sound announcing that the usage time and date almost reaches the end time. In this case, it is only necessary that the device 10-1 is capable of outputting an image or a sound and a projector, a meeting terminal, an electronic blackboard, an image forming device, and an information processing device may be taken as examples.

Figure 6:
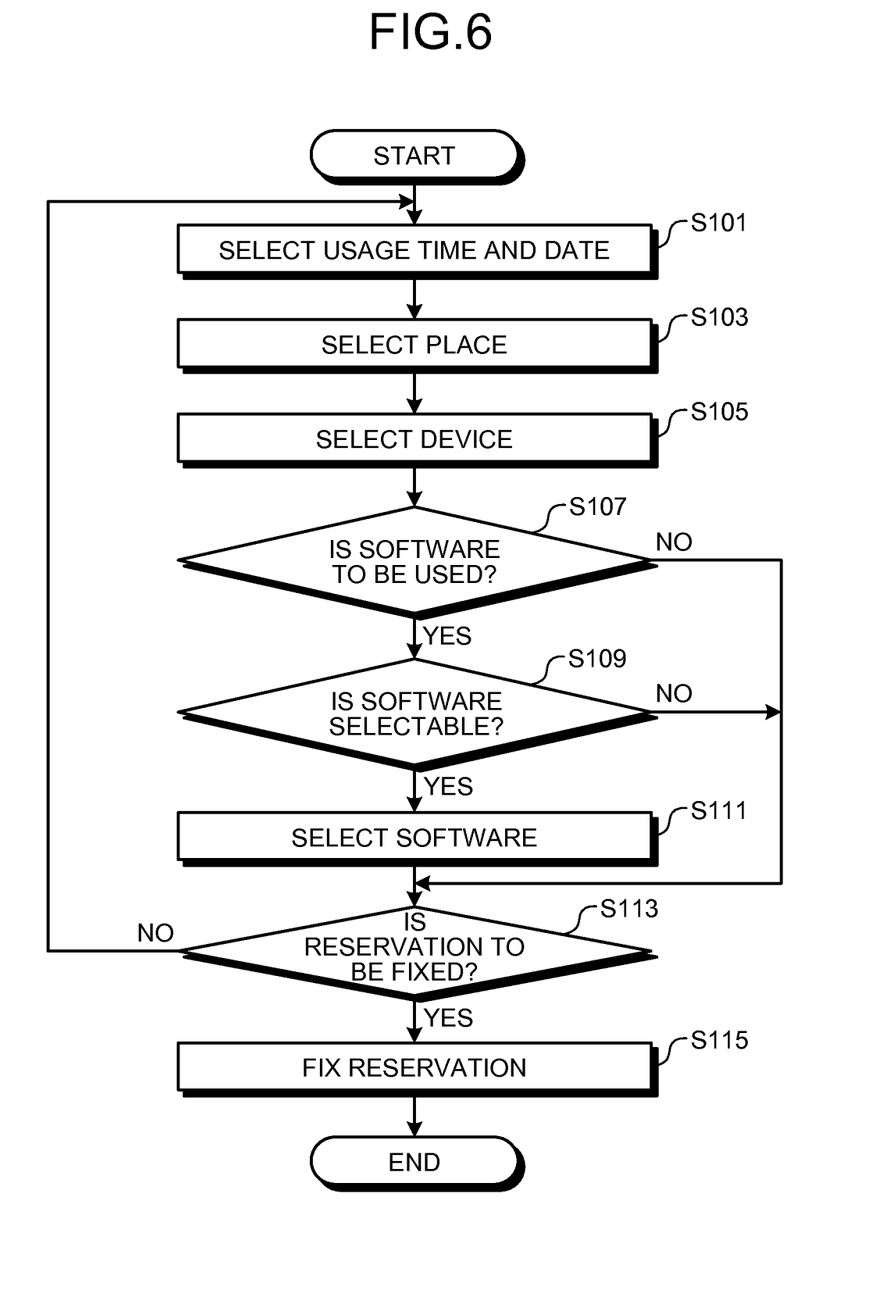
FIG. 6 is a flowchart of an example of a reservation processing to be executed in the device controlling system according to the embodiment.

FIG. 6 is a flowchart of an example of a reservation processing to be executed in the device controlling system 1 according to the embodiment.

The reserving unit 151 of the reservation management device 100 first receives an input of a selected usage time and date from an information processing device used by a user (step S101).

The reserving unit 151 then receives an input of place identifying information indicating a selected place from the information processing device used by the user (step S103).

The reserving unit 151 then receives an input of device identifying information that indicates a selected device 10 from the information processing device used by the user (step S105).

When using software with the selected device 10 ("Yes" at step S107) and the software is selectable ("Yes" at step S109), the reserving unit 151 receives an input of software identifying information indicating the selected software (step S111).

For the software to be used with the device 10 here, an application for meeting which is used when the device 10 is a meeting terminal is taken as an example. For the case where the software is selectable, a case where under a condition that the software is administered by license and the software can be used at the same time only for the number of contracted license, the license remains on the usage time and date input at step S101 is taken as an example.

When not using the software with the selected device 10 ("No" at step S107) or when the software is not selectable ("No" at step S109), the processing at step S111 is not executed.

When receiving an input of fixing the reservation from the information processing device used by the user ("Yes" at step S113), the reserving unit 151 stores, as the reservation information, the received information in the reservation information storage unit 141 and fixes the reservation (step S115).

Here, when not receiving the input of fixing the reservation from the information processing device used by the user ("No" step S113), the reserving unit 151 returns to step S101 and receives a correction of the selection and the like.

Figure 7:
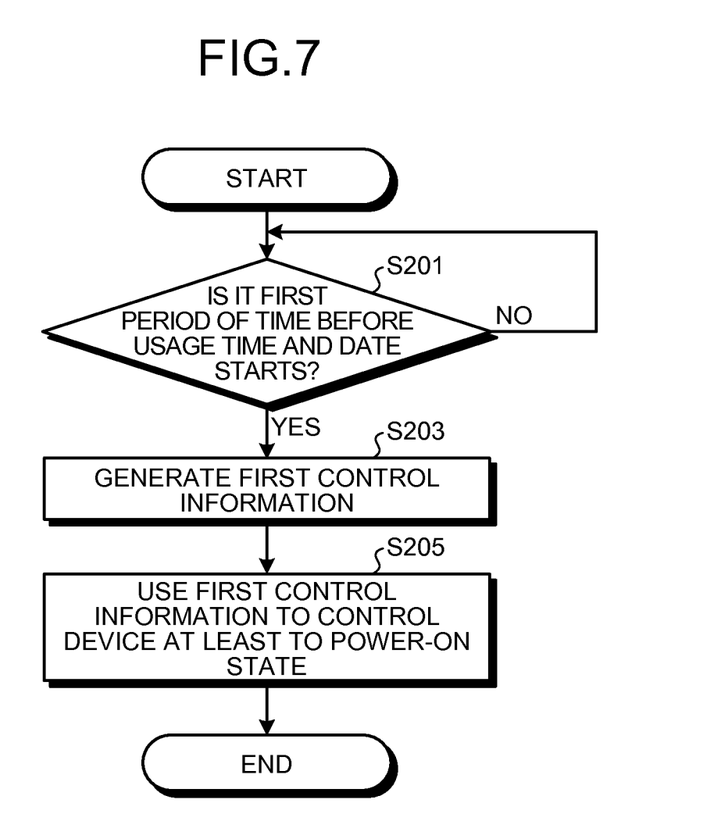
FIG. 7 is a flowchart of an example of a start processing to be executed in the device controlling system according to the embodiment.

FIG. 7 is a flowchart of an example of a start processing to be executed in the device controlling system 1 according to the embodiment.

The determining unit 153 sees the reservation information stored in the reservation information storage unit 141 and checks the presence/absence of reservation information whose usage time and data starts in the first period of time (step S201). When the reservation information whose usage time and data starts in the first period of time is not present ("No" at step S201), the processing returns to step S201.

When the reservation information whose usage time and data starts in the first period of time is present ("Yes" at step S201), the determining unit 153 notifies the device controlling apparatus 200 of the first device identifying information included in the reservation information at least to turn on the device indicated by the first device identifying information and the control information generator 253 generates the first control information that controls and brings the device 10 indicated by the first device identifying information at least to the power-on state based on the notified first device identifying information (step S203).

The device controller 255 then uses the first control information to control and bring the device 10 at least to the power-on state (step S205).

Figure 8:
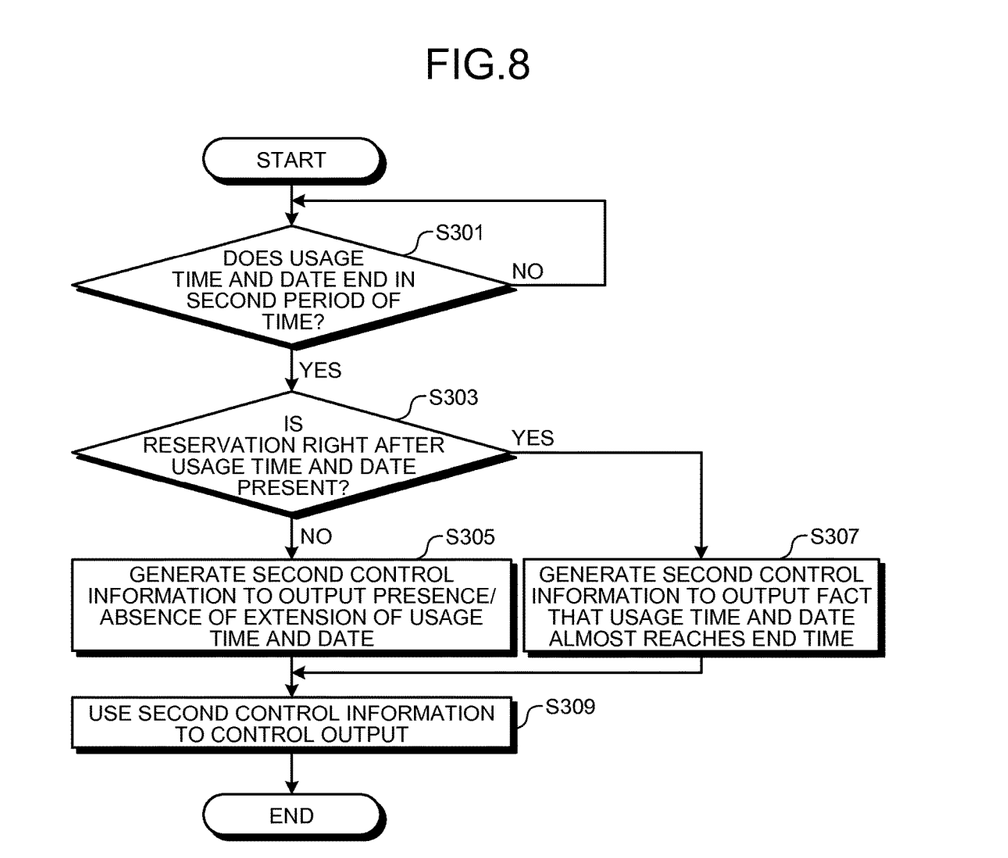
FIG. 8 is a flowchart of an example of an end processing to be executed in the device controlling system according to the embodiment.

FIG. 8 is a flowchart of an example of an end processing to be executed in the device controlling system 1 according to the embodiment.

The determining unit 153 first sees the reservation information stored in the reservation information storage unit 141 and checks the presence/absence of the reservation information whose usage time and date ends in the second period of time (step S301). When the reservation information whose usage time and date ends in the second period of time is not present ("No" at step S301), the processing returns to step S301.

When the reservation information whose usage time and date ends in the second period of time is present ("Yes" at step S301), the determining unit 153 sees another reservation information including the place identifying information included in the reservation information to determine the presence/absence of reservation of using the place indicated by the place identifying information right after the end of the usage time and date (step S303).

When the reservation is not present ("No" at step S303), the determining unit 153 notifies the device controlling apparatus 200 of the first device identifying information included in the reservation information whose usage time and date ends in the second period of time and the absence of next reservation and the control information generator 253 generates the second control information that causes the device 10 indicated in the first device identifying information to output the image or the sound announcing the presence/absence of the extension of the usage time and date (step S305).

On the other hand, when the reservation is present ("Yes" at step S303), the determining unit 153 notifies the device controlling apparatus 200 of the first device identifying information included in the reservation information whose usage time and date ends in the second period of time and the presence of the next reservation and the control information generator 253 generates the second control information that causes the device 10 indicated by the first device identifying information to output the image or the sound announcing that the usage time and date almost reaches the end time (step S307).

Then, when the second control information is the control information generated at step S305, the device controller 255 controls the device 10 indicated by the first device identifying information to output the image or the sound announcing the presence/absence of the extension of the usage time and date, and when the second control information is the control information generated at step S307, the device controller 255 controls the device 10 indicated by the first device identifying information to output the image or the sound announcing that the usage time and date almost reaches the end time (step S309).

As explained so far, reservation information and device information is used to control a device arranged in a reserved place in the embodiment. It is therefore possible according to the embodiment to control and bring the device to a state of being operable to suit a purpose, for example, to the power-on state, without a labor by a user, i.e., automatically to fit with a start time of the usage time and date and thereby to suppress a load on the user in bringing the device to the state of being operable to suit the purpose.

Modification

In the embodiment, assumed is a case where a plurality of pieces of first device identifying information are included in the reservation information and the device 10 indicated by one piece of the first device identifying information is a blackboard. In this case, the device 10 as a blackboard may transmit to the reservation management device 100 when a user performs an operation for sharing, output information (screen information, for example) output by the device 10 with its own first device identifying information, the reservation management device 100 may transmit the output information and another piece of first device identifying information included in the reservation information in which the first device identifying information is included to the device controlling apparatus 200, and the device controller 255 may distribute the output information to a device 10 indicated by the other piece of first device identifying information.

This manner enables automating a data sharing in the middle of an ongoing meeting.

Besides, a part or all of the functions of the reservation management device 100 and the device controlling apparatus 200 may be consolidated in the embodiment.

Hardware Configuration

Figure 9:
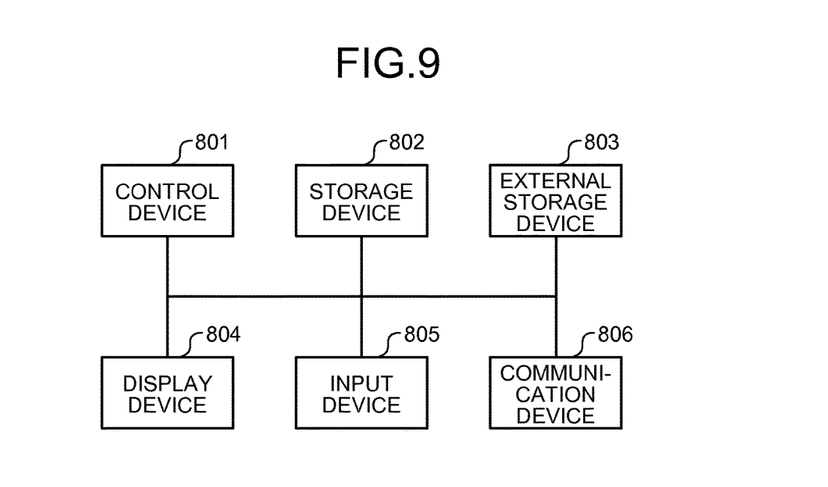
FIG. 9 illustrates an example of a hardware configuration of devices according to the embodiment.

FIG. 9 illustrates an example of a hardware configuration of the reservation management device 100 and the device controlling apparatus 200 (hereinafter referred to as "devices") according to the embodiment. Each of the devices according to the embodiment is provided with: a control device 801 such as a CPU; a storage device 802 such as a ROM and a RAM; an external storage device 803 such as an HDD; a display device 804 such as a display; an input device 805 such as a keyset and a mouse; and a communication I/F (interface) 806, and has a hardware configuration using a normal computer.

A program to be executed in each of the devices according to the embodiment is provided by being recorded in a file of an installable format or of an executable format in a computer-readable recording medium such as a CD-ROM, a CD-R, a memory card, a DVD (Digital Versatile Disk), and a flexible disk (FD).

The program to be executed in each of the devices according to the embodiment may be provided by being stored on a computer connected to a network such as the Internet and downloaded via the network. Besides, the program to be executed in each of the devices according to the embodiment may be provided or distributed via a network such as the Internet. Moreover, the program to be executed in each of the devices according to the embodiment may be provided by being preloaded in a ROM and the like.

The program to be executed in each of the devices according to the embodiment has a module configuration that enables the above-described components to be realized on a computer. As an actual hardware, the CPU reads out from the HDD onto the RAM and executes the program, so that each component is realized on the computer.

According to the embodiment as described above, there is an advantage of being capable of suppressing a load on a user in bringing a device to a state that enables an operation appropriate to a purpose to be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device controlling system for controlling devices connected via a network, the device controlling system comprising one or more processors, to execute program instructions in a non-transitory medium to perform steps of:
  receiving place identifying information for identifying a place and a usage time and date when the place is used;
  making a reservation for usage of the place and a device arranged at the place on the usage time and date;
  bringing the device to a power-on state based on the usage time and date and device identifying information for identifying the device on the network,
  obtaining device information at least including the device identifying information, and generating, using the device information, control information used for bringing the device to the power-on state, the device being brought to the power-on state, using the control information, a first period of time before the usage time and date starts.

2. The device controlling system according to claim 1, wherein the control information is used to cause the device to be in the power-on state and a network connection state, and
  the system brings the device to the power-on state and to the network connection state, using the control information.

3. The device controlling system according to claim 1, wherein
  the device is a meeting terminal, and
  the system receives specifying information for specifying another meeting terminal that communicates with the meeting terminal, and specifies the another meeting terminal based on the specifying information, and obtains device information at least including device identifying information for identifying the another meeting terminal on the network, and generates, as the control information, information used for bringing the meeting terminal to a state of being available for meeting with the another meeting terminal, by using the device information of the meeting terminal and the device information of the another meeting terminal, and the system brings the meeting terminal to the state of being available for meeting with the another meeting terminal, by using the control information.

4. The device controlling system according to claim 1, wherein the system receives software identifying information for identifying software to be used in the device, and further makes a reservation for usage of the software with the device, and wherein the control information is used to cause the device to execute the software, and the system causes the device to execute the software by using the control information.

5. The device controlling system according to claim 1, wherein the system receives electronic data to be used in the device, and makes a reservation for usage of the electronic data, and the system distributes the electronic data to the device the first period of time before the usage time and data starts.

6. The device controlling system according to claim 1, wherein the device is configured to output at least one of an image and a sound, the system generates, using the device information, control information used to cause the device to output at least one of an image and a sound indicating whether the usage time and date is extended or indicating that the usage time and date almost reaches an end time, and the system causes, using the control information, the device to output the at least one of the image and the sound indicating whether the usage time and date is extended or indicating that the usage time and date almost reaches the end time, a second period of time before the usage time and date ends.

7. The device controlling system according to claim 6, wherein when the place right after the usage time and date is not reserved, the system generates, as the control information, information used to cause the device to output the at least one of the image and the sound indicating whether the usage time and date is extended, and when the place right after the usage time and date is reserved, the system generates, as the control information, information used to cause the device to output at least one of the image and the sound indicating that the usage time and date almost reaches the end time.

8. The device controlling system according to claim 1, wherein a plurality of devices are provided, and the system distributes output information output by one of the devices to another device or other devices after the usage time and date starts.

9. A device controlling apparatus used in a device controlling system for controlling devices connected via a network, the device controlling apparatus comprising a processor to execute instructions in a non-transitory medium to perform steps of:

receiving place identifying information for identifying a place and a usage time and date when the place is used;

making a reservation for usage of the place and a device arranged at the place on the usage time and date;

bringing the device to a power-on state based on the usage time and date and device identifying information for identifying the device on the network;

obtaining device information at least including the device identifying information, and generating, using the device information, control information used for bringing the device to the power-on state, the device being brought to the power-on state, using the control information, a first period of time before the usage time and date starts.

10. A device controlling method for controlling devices connected via a network, the device controlling method implemented in a device controlling apparatus comprising a processor to execute program instructions in a non-transitory medium to perform steps of:

receiving place identifying information for identifying a place and a usage time and date when the place is used;

making a reservation for usage of the place and a device arranged at the place on the usage time and date;

bringing the device to a power-on state based on the usage time and date and device identifying information for identifying the device on the network; and obtaining device information at least including the device identifying information, and generating, using the device information, control information used for bringing the device to the power-on state, the device being brought to the power-on state, using the control information, first period of time before the usage time and date starts.

* * * * *